United States Patent
Kojima et al.

(10) Patent No.: US 9,132,698 B2
(45) Date of Patent: Sep. 15, 2015

(54) RUBBER COMPOSITION FOR STUDLESS TIRE AND STUDLESS TIRE USING THE SAME

(75) Inventors: Ryoji Kojima, Kobe (JP); Takayuki Hattori, Kobe (JP); Naohiko Kikuchi, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 806 days.

(21) Appl. No.: 12/484,498

(22) Filed: Jun. 15, 2009

(65) Prior Publication Data
US 2010/0051153 A1    Mar. 4, 2010

(30) Foreign Application Priority Data

Sep. 1, 2008 (JP) ................... 2008-224046
Apr. 30, 2009 (JP) ................... 2009-111245

(51) Int. Cl.
| | |
|---|---|
| B60C 11/00 | (2006.01) |
| B60C 1/00 | (2006.01) |
| B60C 11/03 | (2006.01) |
| C08K 5/09 | (2006.01) |
| C08K 5/20 | (2006.01) |
| C08L 7/00 | (2006.01) |
| C08K 5/548 | (2006.01) |

(52) U.S. Cl.
CPC ............ *B60C 1/0016* (2013.04); *B60C 11/0332* (2013.04); *C08K 5/09* (2013.01); *C08K 5/20* (2013.01); *C08L 7/00* (2013.01); *B60C 2011/0025* (2013.04); *C08K 5/548* (2013.01)

(58) Field of Classification Search
CPC .................... B60C 1/0016; B60C 11/0332
USPC ..................... 152/209.1, 209.5, 905
See application file for complete search history.

(56) References Cited

U.S. PATENT DOCUMENTS

| | | | | |
|---|---|---|---|---|
| 4,517,336 A | * | 5/1985 | Wolff et al. ................. | 156/110.1 |
| 5,975,173 A | * | 11/1999 | Izumoto et al. ............ | 152/209.4 |
| 6,512,035 B1 | * | 1/2003 | Hergenrother et al. ..... | 152/209.1 |
| 6,881,770 B2 | * | 4/2005 | Mizuno et al. ................ | 524/492 |
| 7,237,588 B2 | * | 7/2007 | Suzuki ........................ | 152/209.5 |
| 2003/0111770 A1 | * | 6/2003 | Bohm et al. .................. | 264/326 |
| 2004/0211111 A1 | | 10/2004 | Kikuchi | |
| 2006/0280925 A1 | * | 12/2006 | Kim et al. ................... | 152/209.4 |

FOREIGN PATENT DOCUMENTS

| | | |
|---|---|---|
| EP | 1 961 785 A1 | 8/2008 |
| JP | 61-202901 A * | 9/1986 |

(Continued)

OTHER PUBLICATIONS

Blow, Rubber Technology and Manufacture, pp. 198-203, date 1971.*

(Continued)

*Primary Examiner* — Steven D Maki
(74) *Attorney, Agent, or Firm* — Birch, Stewart, Kolasch & Birch, LLP

(57) ABSTRACT

The present invention has its object to provide a high performance studless tire, which has both good braking force and high handling stability on ice or snow, at higher productivity and at a lower price for customers. The studless tire comprises a tread made of a rubber composition that contains 0.5 to 5.0 parts by mass of a fatty acid and/or a derivative of the fatty acid per 100 parts by mass of a rubber component.

4 Claims, 1 Drawing Sheet

(56) References Cited

FOREIGN PATENT DOCUMENTS

| | | | |
|---|---|---|---|
| JP | 04-085113 A | * | 3/1992 |
| JP | 6-40213 A | | 2/1994 |
| JP | 06-040213 A | * | 2/1994 |
| JP | 08-108710 A | * | 4/1996 |
| JP | 09-309301 A | * | 12/1997 |
| JP | 11-80422 A | | 3/1999 |
| JP | 2000-185526 | | 7/2000 |
| JP | 2001-47814 A | | 2/2001 |
| JP | 2002-97304 A | | 4/2002 |
| JP | 2003-213039 A | | 7/2003 |
| JP | 2005-537369 | | 12/2005 |
| JP | 2007-176417 A | | 7/2007 |
| JP | 2007-2041735 A | | 8/2007 |
| JP | 2007-321039 A | | 12/2007 |
| JP | 2007-321041 A | * | 12/2007 |
| JP | 2008-50432 A | | 3/2008 |
| JP | 2008-138046 A | | 6/2008 |

OTHER PUBLICATIONS machine translation for Japan 09-309301 (no. date).*
machine translation for Japan 08-108710 (no. date).*
machine translation for Japan 06-040213 (no. date).*

* cited by examiner

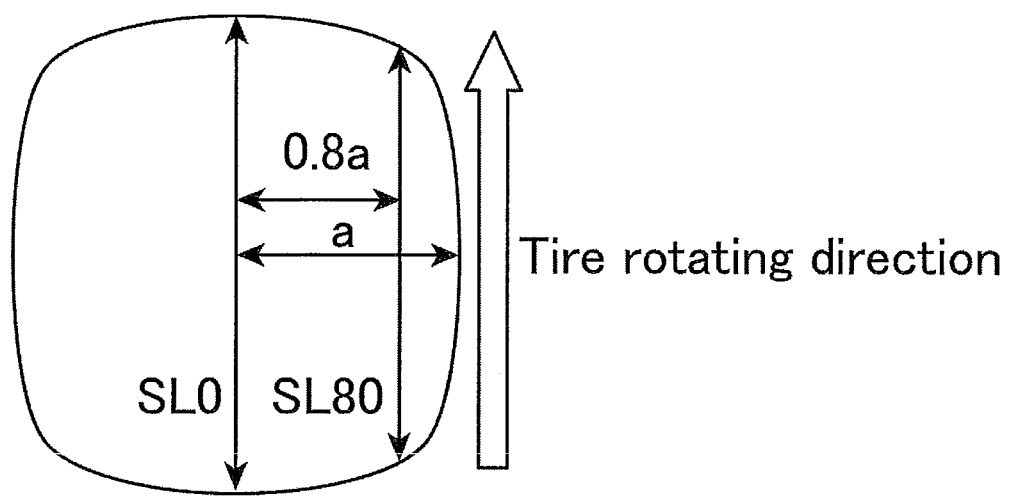

RUBBER COMPOSITION FOR STUDLESS TIRE AND STUDLESS TIRE USING THE SAME

TECHNICAL FIELD

The present invention relates to a rubber composition for a studless tire (a winter tire) and a studless tire using the same.

BACKGROUND ART

Use of spike tires has been banned by law in Japan so as to prevent powder dust pollution resulting from the spike tires, and thus studless tires are now used instead of the spike tires in cold regions. In order to improve grip performance of the studless tires on ice or snow, there is a method that decreases an elastic modulus at low temperatures and improves traction. Particularly, the braking force on ice is largely affected by an effective-contact area between rubber and ice. In order to enlarge the effective-contact area, a rubber has been desired which is flexible at low temperatures.

The market has recently required studless tires contributing to both handling stability, which is a disadvantage of the conventional studless tires, and performance on ice and snow. In the case where the hardness of rubber alone is increased so as to improve the handling stability, the hardness at low temperatures increases to cause deterioration of the performance on ice and snow.

Generally, a natural rubber or a butadiene rubber is often used as a main ingredient in a tread rubber of a studless tire not only for trucks, buses and light trucks but also for passenger vehicles (for example, see JP 2007-176417 A). This is because these rubbers have a low glass transition temperature and flexibility even though they have high strength. However, reversion occurs when the natural rubber or butadiene rubber is sulfur-vulcanized. In this phenomenon, rubber degrades or its cross-linked state deteriorates, so that the elastic modulus at low temperatures also decreases. However, the inventors of the present invention have found from their studies that the hardness also excessively decreases and thus the handling stability decreases. In addition, the reversion may decrease the abrasion resistance and increase tan δ at high temperatures excessively, thereby decreasing fuel economy.

For some tires including studless tires, vulcanization is performed at higher temperatures in order to increase the productivity of tires. In this case, the above phenomenon, particularly, is more pronounced. Accordingly, there is an additional problem of decrease in abrasion resistance and fuel economy caused by the reversion.

SUMMARY OF THE INVENTION

An object of the present invention is to solve the above problems and provide a high performance studless tire which contributes to both good braking force and high handling stability on ice or snow. Further, another object of the present invention is to provide the studless tire at higher productivity and at a lower price for customers.

The present invention relates to a studless tire comprising a tread made of a rubber composition that contains 0.5 to 5.0 parts by mass of a fatty acid and/or a derivative of the fatty acid per 100 parts by mass of a rubber component, a shape of a contact patch of the tread satisfying the following formula (1):

$$1.05 \leq SL0/SL80 \leq 1.20 \tag{1},$$

wherein SL0 represents a contact patch length in a tire circumferential direction on a tire equator line, and SL80 represents a contact patch length in a tire circumferential direction at a position outwardly away from the tire equator line to the extent of 80% of a half contact patch width in a tire axis direction, the shape of the contact patch being formed by applying a normal load to the tire in a standard state in which the tire is mounted on a regular rim, inflated to a normal internal pressure and applied with no load, to press the tread onto a flat plane.

The tread desirably has a JIS-A hardness of 44 to 55.

BRIEF DESCRIPTIONS OF DRAWINGS

FIG. 1 is a schematic view, which shows the contact patch formed upon pressing the tread onto a flat plane.

BEST MODE FOR CARRYING OUT THE INVENTION

The studless tire of the present invention comprises a tread made of a rubber composition that contains 100 parts by mass of a rubber component and 0.5 to 5.0 parts by mass of a fatty acid and/or a derivative of the fatty acid.

If a mixture of a butadiene rubber and another rubber is used as the rubber component, the another rubber is not particularly limited. Examples of the another rubber include natural rubbers (NR), epoxidized natural rubbers (ENR), styrene-butadiene rubbers (SBR), isoprene rubbers (IR), ethylene propylene diene rubbers (EPDM), chloroprene rubbers (CR), acrylonitrile butadiene rubbers (NBR), butyl rubbers (IIR), and halogenated butyl rubbers (X-IIR). It is particularly desirable that the NR and/or the ENR be contained because it is possible to be environment friendly, to prepare for a future decrease in oil supply, and to improve the abrasion resistance.

The rubber component may comprise at least one functional group (hereinafter referred to as the functional group) selected from the group consisting of alkoxy, alkoxysilyl, epoxy, glycidyl, carbonyl, ester, hydroxy, amino, and silanol. Commercially available rubber or its appropriately modified rubber may be used as a rubber comprising the functional group.

It is desirable that the rubber composition contains a butadiene rubber. Blending the butadiene rubber improves the braking performance of the studless tires on ice and the handling stability of the studless tires on ice and snow. The lower limit of the butadiene rubber content in 100% by mass of the rubber component is desirably 20% by mass, more desirably 30% by mass, even more desirably 35% by mass, and most desirably 50% by mass. On the other hand, the upper limit thereof in 100% by mass of the rubber component is desirably 80% by mass, more desirably 70% by mass, even more desirably 65% by mass, and most desirably 60% by mass. If the butadiene rubber content is less than 20% by mass, the glass transition temperature tends not to decrease and the braking force on ice or snow may decrease. If the butadiene rubber content exceeds 80% by mass, good performance on ice and snow may be achieved, but the mechanical strength and the abrasion resistance tend to decrease. According to the present invention, it is possible to increase a butadiene rubber content so as to contribute to both abrasion resistance and performance on ice and snow.

It is possible to improve the abrasion resistance if a butadiene rubber having a molecular weight distribution (Mw/Mn) of 3.0 or less is used. Further, a butadiene rubber with a Mw/Mn of 3.0 to 3.4 may be used. Use of such a butadiene rubber can improve both processability and abrasion resistance.

In the case of using the butadiene rubber mixed with a natural rubber and/or a polyisoprene rubber, the total amount of these rubbers in the rubber component is desirably 70% by mass or more. With the amount of 70% by mass or more, it is possible to achieve both good performance on ice and snow and good abrasion resistance, and thereby increase the reversion resistance. The amount of these rubbers is more desirably 80% by mass or more, even more desirably 90% by mass or more, and most desirably 100% by mass.

The fatty acid and/or the derivative of the fatty acid is not particularly limited. Examples of the fatty acid may include aliphatic carboxylic acids derived from vegetable oils such as coconut oil, palm kernel oil, camellia oil, olive oil, almond oil, canola oil, peanut oil, rice bran oil, cacao butter, palm oil, soybean oil, cottonseed oil, sesame oil, linseed oil, castor oil and rapeseed oil; aliphatic carboxylic acids derived from animal oils such as beef tallow; aliphatic carboxylic acids chemically synthesized from petroleum or the like; stearic acid; palmitic acid; myristic acid; lauric acid; caprylic acid; oleic acid; and linoleic acid. Examples of the derivative may include metal salts such as zinc salt, calcium salt and magnesium salt. Also, commercially available processing aids containing these fatty acids can be suitably used. Among them, the metal salts of an aliphatic carboxylic acid, particularly a zinc salt of an aliphatic carboxylic acid, are desirably used due to its good reversion resistance.

The number of carbon atoms in the fatty acid and/or the derivative thereof is desirably 4 or more, and more desirably 6 or more. If the number of carbon atoms is less than 4, the dispersibility tends to decrease. The number of carbon atoms in the fatty acid and/or the derivative thereof is desirably 16 or less, more desirably 14 or less, and even more desirably 12 or less. If the number of carbon atoms exceeds 16, the reversion tends not to be sufficiently suppressed.

Here, an aliphatic group in the fatty acid and/or the derivative thereof may be one having a chain structure such as an alkyl group or one having a ring structure such as a cycloalkyl group.

The content of the fatty acid and/or the derivative thereof per 100 parts by mass of the rubber component is 0.5 parts by mass or more, desirably 1.0 part by mass or more, even more desirably 2.0 parts by mass or more. If the content is less than 0.5 parts by mass, sufficient reversion resistance may not be ensured and thereby it may be difficult to improve the handling stability and the like. The above content is 5.0 parts by mass or less, desirably 4.0 parts by mass or less, and even more desirably 3.0 parts by mass or less. If the content exceeds 5.0 parts by mass, the processability may decrease as described below due to an excessive decrease in the viscosity, and the fatty acid and/or the derivative thereof tends to bloom.

It is desirable that the rubber composition further contains an aromatic carboxylic acid and/or a derivative of the aromatic carboxylic acid. Combination use of the fatty acid and/or the derivative thereof and the aromatic carboxylic acid and/or the derivative thereof can improve, particularly, the reversion resistance of the butadiene rubber and further improve the processability of a composition containing silica. Thus, the reversion of the composition containing silica can be more effectively suppressed.

Examples of the aromatic carboxylic acid include benzoic acid, phthalic acid, mellitic acid, hemimellitic acid, trimellitic acid, diphenic acid, toluic acid, and naphthoic acid. Examples of the aromatic carboxylic acid derivative include metal salts of the aromatic carboxylic acid such as zinc salt, calcium salt and magnesium salt. Among these salts, the metal salts of an aromatic carboxylic acid, particularly a zinc salt, are desirably used due to its sufficient reversion resistance. Benzoic acid, phthalic acid, or naphthoic acid is desirable as the aromatic carboxylic acid in view of the reversion resistance.

The content of the aromatic carboxylic acid and/or the derivative thereof per 100 parts by mass of the rubber component is 0.05 parts by mass or more, desirably 0.1 parts by mass or more, and more desirably 0.15 parts by mass or more. If the content is less than 0.05 parts by mass, sufficient reversion resistance may not be ensured and thereby it may be difficult to improve the handling stability and the like. The above content is 0.5 parts by mass or less, desirably 0.4 parts by mass or less, and even more desirably 0.3 parts by mass or less. If the content exceeds 0.5 parts by mass, the processability may decrease due to an excessive decrease in viscosity, and the fatty acid and/or the derivative thereof tends to bloom.

If the rubber composition contains a mixture of the fatty acid and/or the derivative thereof and the aromatic carboxylic acid and/or the derivative thereof, a content ratio between the fatty acid and/or the derivative thereof and the aromatic carboxylic acid and/or the derivative thereof in the mixture [molar ratio: (the fatty acid and/or the derivative thereof)/(the aromatic carboxylic acid and/or the derivative thereof), hereinafter referred to as the "content ratio"] is desirably 1/20 or more, more desirably 1/15 or more, and even more desirably 1/10 or more. If the content ratio is less than 1/20, it may be impossible to be environment friendly and to prepare for a future decrease in oil supply, and the dispersibility and stability of the mixture tend to worsen. Furthermore, the content ratio is desirably 20/1 or less, more desirably 15/1 or less, and even more desirably 10/1 or less. If the content ratio exceeds 20/1, the reversion tends not to be sufficiently suppressed. Here, the content ratio is: (the total amount of the fatty acid and the derivative thereof)/(the total amount of the aromatic carboxylic acid and the derivative thereof).

In the case of using the above mixture, a metal content in the mixture is desirably 3% by mass or more, and more desirably 5% by mass or more. If the metal content in the mixture is less than 3% by mass, the reversion tends not to be sufficiently suppressed. Furthermore, the metal content in the mixture is desirably 30% by mass or less, and more desirably 25% by mass or less. If the metal content in the mixture exceeds 30% by mass, the processability tends to decrease and the cost may unnecessarily increase.

The above rubber composition desirably contains an oil or a plasticizer. This makes it possible to ensure the mixing and kneading processability and to ensure the rubber flexibility at low temperatures.

Examples of the oil include paraffinic process oils, aromatic process oils, and naphthenic process oils. Particularly, the paraffinic process oils are preferably used in view of the low-temperature properties (that is, retaining the flexibility at low temperatures). Specific examples of the paraffinic process oils may include PW-32, PW-90, PW-150 and PS-32 which are produced by Idemitsu Kosan Co., Ltd. Further, specific examples of the aromatic process oils may include AC-12, AC-460, AH-16, AH-24 and AH-58 which are produced by Idemitsu Kosan Co., Ltd.

If the rubber composition contains the oil or the plasticizer, the amount of this component per 100 parts by mass of the rubber component is desirably 5 parts by mass or more, more desirably 10 parts by mass or more, and even more desirably 15 parts by mass or more. If the amount is less than 5 parts by mass, it may be difficult to ensure the mixing and kneading processability and to ensure the low-temperature properties. Meanwhile, the amount thereof per 100 parts by mass of the rubber component is desirably 35 parts by mass or less, more desirably 30 parts by mass or less, and even more desirably 25 parts by mass or less. If this component is contained too much, the abrasion resistance may decrease and the reversion resistance may also decrease. Furthermore, if the oil is contained too much, a slipping phenomenon (incapability of kneading the component due to slipping) may occur to cause insufficient kneading when mixing and kneading, and thus fillers (carbon, silica fillers) may not be dispersed.

It is desirable that the rubber composition further contains silica. Blending silica can improve the braking performance on ice and the handling stability on ice and snow which are important for studless tires. In particular, a mixture of the zinc salt of the aliphatic carboxylic acid and the zinc salt of the aromatic carboxylic acid can improve the processability of the composition containing silica and can more effectively suppress the reversion of the composition containing silica. Examples of the silica include, but not limited to, silica produced by a wet process, silica produced by a dry process, and the like.

A nitrogen adsorption specific surface area ($N_2SA$) of the silica is 40 $m^2/g$ or more, and desirably 50 $m^2/g$ or more. If the $N_2SA$ of the silica is less than 40 $m^2/g$, its reinforcing effect may be insufficient. The $N_2SA$ of the silica is 450 $m^2/g$ or less, and desirably 400 $m^2/g$ or less. If the $N_2SA$ of the silica exceeds 450 $m^2/g$, the dispersibility may decrease and heat generation in the rubber composition may increase; thus, this value is not desirable.

The silica content per 100 parts by mass of the rubber component is desirably 10 parts by mass or more, more desirably 15 parts by mass or more, even more desirably 20 parts by mass or more, and most desirably 35 parts by mass or more. If the silica content is less than 10 parts by mass, the braking performance on ice and the handling stability on ice and snow tend not to be improved. Furthermore, the silica content per 100 parts by mass of the rubber component is 150 parts by mass or less, desirably 120 parts by mass or less, and more desirably 100 parts by mass or less. If the silica content exceeds 150 parts by mass, the processability and the workability may decrease; thus, this value is not desirable.

It is desirable that the rubber composition contains a silane coupling agent.

Any silane coupling agents conventionally used with silica in the rubber industries can be used as the silane coupling agent. Examples thereof include: sulfide-type silane coupling agents such as
bis(3-triethoxysilylpropyl)tetrasulfide,
bis(2-triethoxysilylethyl)tetrasulfide,
bis(4-triethoxysilylbutyl)tetrasulfide,
bis(3-trimethoxysilylpropyl)tetrasulfide,
bis(2-trimethoxysilylethyl)tetrasulfide,
bis(4-trimethoxysilylbutyl)tetrasulfide,
bis(3-triethoxysilylpropyl)trisulfide,
bis(2-triethoxysilylethyl)trisulfide,
bis(4-triethoxysilylbutyl)trisulfide,
bis(3-trimethoxysilylpropyl)trisulfide,
bis(2-trimethoxysilylethyl)trisulfide,
bis(4-trimethoxysilylbutyl)trisulfide,
bis(3-triethoxysilylpropyl)disulfide,
bis(2-triethoxysilylethyl)disulfide,
bis(4-triethoxysilylbutyl)disulfide,
bis(3-trimethoxysilylpropyl)disulfide,
bis(2-trimethoxysilylethyl)disulfide,
bis(4-trimethoxysilylbutyl)disulfide,
3-trimethoxysilylpropyl-N,N-dimethylthiocarbamoyl tetrasulfide,
3-triethoxysilylpropyl-N,N-dimethylthiocarbamoyl tetrasulfide,
2-triethoxysilylethyl-N,N-dimethylthiocarbamoyl tetrasulfide,
2-trimethoxysilylethyl-N,N-dimethylthiocarbamoyl tetrasulfide, 3-trimethoxysilylpropylbenzothiazolyl tetrasulfide, 3-triethoxysilylpropylbenzothiazol tetrasulfide, 3-triethoxysilylpropylmethacrylatemonosulfide, and 3-trimethoxysilylpropylmethacrylate monosulfide; mercapto-type silane coupling agents such as 3-mercaptopropyl trimethoxysilane, 3-mercaptopropyl triethoxysilane, 2-mercaptoethyl trimethoxysilane, and 2-mercaptoethyl triethoxysilane; vinyl-type silane coupling agents such as vinyl triethoxysilane, and vinyl trimethoxysilane; amino-type silane coupling agents such as 3-aminopropyl triethoxysilane, 3-aminopropyl trimethoxysilane, 3-(2-aminoethyl)aminopropyl triethoxysilane, and 3-(2-aminoethyl)aminopropyl trimethoxysilane; glycidoxy-type silane coupling agents such as γ-glycidoxypropyl triethoxysilane, γ-glycidoxypropyl trimethoxysilane, γ-glycidoxypropylmethyldiethoxysilane, and γ-glycidoxypropyl methyldimethoxysilane; nitro-type silane coupling agents such as 3-nitropropyl trimethoxysilane, and 3-nitropropyl triethoxysilane; chloro-type silane coupling agents such as 3-chloropropyl trimethoxysilane, 3-chloropropyl triethoxysilane, 2-chloroethyl trimethoxysilane, and 2-chloroethyl triethoxysilane. Each of these silane coupling agents may be used alone, or two or more of these may be used in combination.

The content of the silane coupling agent per 100 parts by mass of the silica is 1 part by mass or more, and desirably 2 parts by mass or more. If the content of the silane coupling agent is less than 1 part by mass, effects of blending the silane coupling agent may not be sufficiently exerted. Furthermore, the content of the silane coupling agent per 100 parts by mass of the silica is 20 parts by mass or less, and desirably 15 parts by mass or less. If the content of the silane coupling agent exceeds 20 parts by mass, no effects commensurate with the cost increase may be exerted on coupling and the reinforcement and the abrasion resistance may decrease; thus, this value is not desirable.

The rubber composition may contain a compounding ingredient conventionally used in the rubber industries, in addition to the rubber component, the fatty acid and/or the derivative thereof, the metal salt of the aromatic carboxylic acid, the oil, the plasticizer, the silica and the silane coupling agent. Examples of the compounding ingredient may include fillers such as a carbon black and eggshell powder; antioxidants; antiozonants; antiaging agents; vulcanization acceleration aids; zinc oxide; peroxides; vulcanizing agents such as sulfur and a sulfur-containing compound; and vulcanization accelerators.

The carbon black content per 100 parts by mass of the rubber component is 5 parts by mass or more, desirably 10 parts by mass or more, more desirably 15 parts by mass or more, and most desirably 20 parts by mass or more. If the carbon black content is less than 5 parts by mass, the reinforcement may be insufficient and it may be difficult to ensure the required block rigidity, handling stability, partial-abrasion resistance, and abrasion resistance. Furthermore, the carbon black content per 100 parts by mass of the rubber component is 60 parts by mass or less, desirably 50 parts by mass or less, and more desirably 40 parts by mass or less. If the carbon black content exceeds 60 parts by mass, the rubber composition tends to harden at low temperatures and the performance on ice tends to decrease greatly.

A tread obtained by using the above rubber composition has a JIS-A hardness of desirably 55 degrees or less, more desirably 53 degrees or less, and even more desirably 50 degrees or less. If the hardness exceeds 55 degrees, the performance on ice and snow tends to decrease. Meanwhile, the above hardness is desirably 44 degrees or more, and more desirably 46 degrees or more. If the hardness is less than 44 degrees, tread pattern blocks of a studless tire tend to be greatly deformed and thereby the performance on ice and snow tends to decrease.

According to the studless tire of the present invention, a shape of a contact patch of the tread satisfies the above formula (1), the contact patch being formed by applying a normal load to the tire in a standard state in which the tire is mounted on a regular rim, inflated to a normal internal pressure and applied with no load, to press the tread onto a flat plane. Such an adjustment of the shape of the contact patch enables the tire to more effectively achieve both good braking force and handling stability on ice or snow.

FIG. 1 shows the shape of the contact patch (hereinafter, also referred to as a "foot print (FP)") formed upon pressing the tread onto a flat plane as mentioned above. The FP desirably satisfies the following formula:

$$1.05 \leq SL0/SL80(\text{FP index}) \leq 1.20.$$

In the formula, SL0 represents a contact patch length in a tire circumferential direction (tire rotating direction) on a tire equator line in FP shown in FIG. 1. Meanwhile, SL80 represents a contact patch length in a tire circumferential direction at a position outwardly away from the tire equator line to the extent of 80% of a half contact patch width (80% of a half contact patch width (a) corresponds to (0.8a)) in a tire axis direction in FP shown in FIG. 1. Here, the "half contact patch width" represents a half of the distance in the tire axis direction between the outermost edges of the FP in the tire axis direction.

The "regular rim" represents a rim for each tire defined by standards. For example, with respect to JATMA, the regular rim is a standard rim; with respect to TRA, "Design Rim"; and with respect to ETRTO, "Measuring Rim".

The "normal internal pressure" represents an air pressure for each tire defined by the standards. With respect to JATMA, the normal internal pressure is the maximum air pressure; with respect to TRA, the maximum value disclosed in the table "TIRE LOAD LIMITS AT VARIOUS COLD INFLATION PRESSURES"; and with respect to ETRTO, "INFLATION PRESSURE".

The "normal load" represents a load for each tire defined by the standards. With respect to JATMA, the normal load is the maximum load capacity; with respect to TRA, the maximum value disclosed in the table "TIRE LOAD LIMITS AT VARIOUS COLD INFLATION PRESSURES"; and with respect to ETRTO, "LOAD CAPACITY".

In the present invention, the FP is specified with the exclusion of grooves on the tread.

If the SL0/SL80 value is less than 1.05, the grip on ice and snow can be achieved but the handling stability tends to decrease. If the SL0/SL80 value exceeds 1.20, the handling stability can be improved but the overall grip including the grip on ice and snow tends to decrease. The lower limit of the SL0/SL80 value is more desirably 1.07 and even more desirably 1.09. On the other hand, the upper limit thereof is more desirably 1.15 and even more desirably 1.13.

The above-mentioned FP can be obtained by appropriately adjusting factors such as a mold profile, a gage distribution, a structure, and the like. The factor to be adjusted is not particularly limited as long as the above FP can be obtained. For example, FP index (SL0/SL80) can be adjusted by modifying tread thicknesses at the central region and/or at the shoulder region to adjust a tread gage distribution. Specifically, FP index can be adjusted to be a high value by reducing the thickness of the tread central region, and to be a low value by increasing the thickness of the tread shoulder region. It is noted that the approach for adjusting FP index is not particularly limited.

Cars to which the present invention can be applied are not particularly limited, and examples of the cars include trucks, buses, light trucks, and passenger vehicles.

With use of the above rubber composition, a studless tire can be produced by a usual method. That is, the studless tire can be produced by preparing a tire tread with use of the rubber composition, laminating the tread with other members, and heating it on a tire molding machine under pressure.

EXAMPLES

Although the present invention is more specifically described based on examples, the present invention is not limited to these examples.

In the following, respective chemical agents used in Examples and Comparative Examples are listed.

Natural rubber (NR): RSS #3

BR: BR 150B produced by Ube Industries, Ltd. (cis-1,4 bond content: 97%, $ML_{1+4}$ (100° C.): 40, viscosity of a 5% solution in toluene at 25° C.: 48 cps, Mw/Mn: 3.3)

Carbon black: DIABLACK I produced by Mitsubishi Chemical Corporation (ISAF carbon, average particle size: 23 nm, DBP oil absorption: 114 ml/100 g)

Silica: Ultrasil VN3 ($N_2SA$: 175 $m^2$/g) produced by Degussa

Silane coupling agent: Si-69 produced by Degussa

Mineral oil: PS-32 (paraffinic process oil) produced by Idemitsu Kosan Co., Ltd.

Fatty acid compound (fatty acid derivative: mixture of zinc salt of aliphatic carboxylic acid and zinc salt of aromatic carboxylic acid): Activator 73A produced by Struktol Company (zinc salt of aliphatic carboxylic acid: zinc salt of fatty acid ($C_8$ to $C_{12}$) derived from coconut oil, zinc salt of aromatic carboxylic acid:zinc benzoate, content molar ratio: 1/1, zinc content: 17% by mass)

Zinc oxide: Zinc oxide #2 produced by Mitsui Mining & Smelting Co., Ltd.

Antiaging agent: NOCRAC 6C (N-(1,3-dimethylbutyl)-N'-phenyl-p-phenylenediamine) produced by OUCHI SHINKO CHEMICAL INDUSTRIAL CO., LTD.

Wax: OZOACE wax produced by Nippon Seiro Co., Ltd.

Sulfur: Sulfur powder produced by Tsurumi Chemical Industry Co., Ltd.

Vulcanization accelerator BBS: NOCCELER NS (N-tert-buthyl-2-benzothiazolylsulfenamide) produced by OUCHI SHINKO CHEMICAL INDUSTRIAL Co., LTD.

Examples 1 to 7 and Comparative Examples 1 and 2

A Banbury mixer was charged with the chemical agents in amounts shown in Process 1 in Table 1 and they were mixed and kneaded for five minutes so as to raise the outlet temperature to about 150° C. Thereafter, the sulfur and the vulcanization accelerator in amounts shown in Process 2 were added to the mixture obtained by Process 1, and they were mixed and kneaded for three minutes at about 80° C. by an open roll mill. Thereby, an unvulcanized rubber composition was obtained. This unvulcanized rubber composition was formed into a tread shape, laminated with other tire members, and then vulcanized for 15 minutes at 170° C., whereby studless tires in the respective Examples 1 to 7 and Comparative Examples 1 and 2 were produced.

FP indexes of these studless tires were adjusted to be the values shown in Table 1 by modifying tread thicknesses at the central region and/or at the shoulder region as to adjust tread gage distributions.

The respective samples were evaluated by the following methods.

(Reversion)

Using a curelastometer, a vulcanization curve of the unvulcanized rubber composition at 170° C. was determined. The maximum torque rise (MH-ML) was regarded as 100, and a torque rise obtained 15 minutes after the start of vulcanization was expressed as a relative value. Then, a value obtained by subtracting the relative value from 100 was regarded as a reversion rate. A lower reversion rate shows that the reversion is more suppressed and better reversion resistance is achieved.

(Viscosity/Processability)

With regard to the viscosity, Mooney viscosity ($ML_{1+4}$/130° C.) of the unvulcanized rubber composition was determined based on JIS K 6300-1 "Rubber, unvulcanized—Physical Property—Part 1: Determination of Mooney viscosity and pre-vulcanization characteristics with Mooney viscometer". That is, a Mooney viscosity tester was preheated for one minute up to 130° C. and a small rotor was rotated under this temperature condition. After four minutes of rotation, the Mooney viscosity was determined. Here, the value was rounded to the nearest whole number.

With regard to the processability, a Mooney viscosity value of 35 or more is evaluated as "+++", that of 32 or more and less than 35 is evaluated as "++", that of 30 or more and less than 32 is evaluated as "+", and that less than 30 is evaluated as "−".

(Hardness)

In accordance with JIS K 6253 "Rubber, vulcanized or thermoplastic—Determination of hardness", the hardness of vulcanized rubber samples in the respective Examples and Comparative Examples was determined by a type A durometer at 25° C. and at −10° C.

(Performance on Ice and Snow)

Using the studless tires of the respective Examples and Comparative Examples, actual vehicle performance on ice and snow was evaluated under the following conditions. Here, studless tires for a passenger vehicle, which have a size of 195/65 R15 and a DS-2 pattern, were produced and the tires were mounted on a 2000 cc FR car made in Japan. The test was run on the test course of Sumitomo Rubber Industries, Ltd. in Nayoro, Hokkaido, Japan. The temperature on ice was from −6 to −1° C. and the temperature on snow was from −10 to −2° C.

Handling performance (evaluation of feeling): Starting, accelerating and stopping of the above car were evaluated by a test driver's feelings. In the evaluation, Comparative Example 1 was regarded as the standard, which was graded 100. Then, grading was performed in such a manner that the tires were graded 120 if the test driver judged that their performance was obviously improved, and the tires were graded 140 if the test driver judged that they were at a high level never seen before.

Braking performance (brake stopping distance on ice): The stopping distance on ice, which is the distance required for the car to stop after stepping on brakes that lock up at 30 km/h, was measured. Then, Comparative Example 2 was taken as a reference and the performance was calculated from the following equation:

(Braking performance index)=(Brake stopping distance in Comparative Example 2)/(Stopping distance)×100.

(Abrasion Resistance)

The tires with a size of 195/65 R15 were mounted on a FF car made in Japan, and the depth of grooves on the tire tread part was measured after the car had run 8000 km. The running distance that makes the depth of the tire grooves decrease by 1 mm was calculated, and the abrasion resistance was expressed with an index calculated from the following equation:

(Abrasion resistance index)=(Running distance at which groove depth is decreased by 1 mm)/(Running distance at which tire groove depth in Comparative Example 1 is decreased by 1 mm)×100.

A larger index shows better abrasion resistance.

(Foot Print Index (SL0/SL80))

The foot print index was calculated by the above method.

A larger value shows a longer contact patch length of a crown portion (a rounder contact patch shape).

Table 1 shows evaluation results of the respective tests.

TABLE 1

|  |  |  | Examples |  |  |  |  |  |  | Comparative Examples |  |
|---|---|---|---|---|---|---|---|---|---|---|---|
|  |  |  | 1 | 2 | 3 | 4 | 5 | 6 | 7 | 1 | 2 |
| Amount (parts by mass) | Process 1 | NR | 60 | 60 | 60 | 60 | 60 | 60 | 60 | 60 | 60 |
|  |  | BR | 40 | 40 | 40 | 40 | 40 | 40 | 40 | 40 | 40 |
|  |  | Carbon black | 30 | 30 | 30 | 30 | 30 | 30 | 30 | 30 | 30 |
|  |  | Silica | 20 | 20 | 20 | 20 | 20 | 20 | 20 | 20 | 20 |
|  |  | Silane coupling agent | 1.6 | 1.6 | 1.6 | 1.6 | 1.6 | 1.6 | 1.6 | 1.6 | 1.6 |
|  |  | Mineral oil | 25 | 25 | 25 | 25 | 25 | 35 | 15 | 25 | 25 |
|  |  | Fatty acid compound | 1.5 | 2.0 | 2.5 | 2.0 | 2.0 | 2.0 | 2.0 | 1.5 | 1.5 |
|  |  | Zinc oxide | 3 | 3 | 3 | 3 | 3 | 3 | 3 | 3 | 3 |
|  |  | Antiaging agent | 1.5 | 1.5 | 1.5 | 1.5 | 1.5 | 1.5 | 1.5 | 1.5 | 1.5 |
|  |  | Wax | 1 | 1 | 1 | 1 | 1 | 1 | 1 | 1 | 1 |
|  | Process 2 | Sulfur | 1.5 | 1.5 | 1.5 | 1.5 | 1.5 | 1.5 | 1.5 | 1.5 | 1.5 |
|  |  | Vulcanization accelerator BBS | 1.0 | 1.0 | 1.0 | 1.0 | 1.0 | 1.0 | 1.0 | 1.0 | 1.0 |
| Foot print index (SL0/SL80) |  |  | 1.15 | 1.15 | 1.15 | 1.05 | 1.20 | 1.15 | 1.15 | 1.00 | 1.25 |
| Evaluation | Reversion rate |  | 6 | 6 | 6 | 6 | 6 | 6 | 6 | 6 | 6 |
|  | Viscosity |  | 35 | 33 | 32 | 35 | 33 | 32 | 36 | 35 | 35 |
|  | Processability |  | +++ | ++ | ++ | +++ | ++ | ++ | +++ | +++ | +++ |
|  | Hardness (25° C.) |  | 48 | 48 | 48 | 48 | 48 | 44 | 52 | 48 | 48 |
|  | Hardness (−10° C.) |  | 52 | 52 | 52 | 52 | 52 | 48 | 56 | 52 | 52 |

TABLE 1-continued

|  | Examples | | | | | | | Comparative Examples | |
| --- | --- | --- | --- | --- | --- | --- | --- | --- | --- |
|  | 1 | 2 | 3 | 4 | 5 | 6 | 7 | 1 | 2 |
| Handling performance | 134 | 134 | 134 | 123 | 136 | 128 | 139 | 100 | 139 |
| Braking performance | 112 | 112 | 112 | 117 | 106 | 123 | 106 | 118 | 100 |
| Abrasion resistance | 100 | 99 | 97 | 99 | 99 | 96 | 105 | 100 | 100 |

Every tire in Examples showed a low reversion rate and appropriate hardness, and achieved both high handling performance and high braking performance on ice. Furthermore, the tire with more suitable foot print index achieved both higher handling performance and higher performance on ice. On the other hand, the tires in Comparative Examples were not able to achieve both high handling performance and high braking performance on ice at the same time.

INDUSTRIAL APPLICABILITY

According to the present invention, it is possible to provide a high performance studless tire, which has both good braking force and high handling stability on ice or snow because the tire comprises a tread made of a rubber composition that contains 0.5 to 5.0 parts by mass of a fatty acid and/or a derivative of the fatty acid per 100 parts by mass of a rubber component; and the tread has a predetermined shape of a contact patch. Furthermore, it is possible to provide the studless tire at higher productivity and at a lower price for customers.

The invention claimed is:

1. A studless tire comprising
a tread made of a rubber composition that contains 0.5 to 5.0 parts by mass of an aliphatic carboxylic acid and/or a metal salt of the aliphatic carboxylic acid per 100 parts by mass of a rubber component containing butadiene rubber, and natural rubber and/or epoxidized natural rubber,
a shape of a contact patch of the tread satisfying the following formula (I):

$$1.05 \leq SL0/SL80 \leq 1.20 \qquad (1),$$

wherein SL0 represents a contact patch length in a tire circumferential direction on a tire equator line, and SL80 represents a contact patch length in the tire circumferential direction at a position outwardly away from the tire equator line to the extent of 80% of a half contact patch width in a tire axis direction,
the shape of the contact patch being formed by applying a normal load to the tire in a standard state in which the tire is mounted on a regular rim, inflated to a normal internal pressure and applied with no load, to press the tread onto a flat plane,
wherein:
the rubber composition further contains silica and carbon black, and
the tread has a JIS-A hardness of 48-56 at −10° C.,
the number of carbon atoms in the aliphatic carboxylic acid and/or the metal salt of the aliphatic carboxylic acid is 4 to 16, and the rubber composition further contains an aromatic carboxylic acid and/or metal salts of the aromatic carboxylic acid,
per 100 parts by mass of the rubber component, the silica content is 10 to 150 parts by mass and the carbon black content is 5 to 60 parts by mass,
the rubber composition contains 0.05 to 0.5 parts by mass of the aromatic carboxylic acid and/or the metal salts of the aromatic carboxylic acid, per 100 parts by mass of the rubber component, and
a content ratio between the aliphatic carboxylic acid and/or the metal salt of the aliphatic carboxylic acid, and the aromatic carboxylic acid and/or the metal salts of the aromatic carboxylic acid in the mixture is 1/20 to 20/1.

2. The studless tire according to claim 1, wherein the aliphatic carboxylic acid and/or the metal salt of the aliphatic carboxylic acid is at least one member selected from the group consisting of coconut oil, palm kernel oil, camellia oil, olive oil, almond oil, canola oil, peanut oil, rice bran oil, cacao butter, palm oil, soybean oil, cottonseed oil, sesame oil, linseed oil, castor oil, rapeseed oil, beef tallow, palmitic acid, myristic acid, lauric acid, caprylic acid, oleic acid, linoleic acid and metal salts thereof.

3. The studless tire according to claim 1,
wherein the butadiene rubber content in 100% by mass of the rubber component is 20 to 80% by mass.

4. The studless tire according to claim 1,
wherein the rubber composition further contains 10 to 35 parts by mass of an oil or a plasticizer, per 100 parts by mass of the rubber component.

* * * * *